United States Patent
Luo

(10) Patent No.: US 10,620,738 B2
(45) Date of Patent: Apr. 14, 2020

(54) TOUCH DISPLAY PANEL, DRIVING METHOD AND TOUCH DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventor: Sijian Luo, Xiamen (CN)

(73) Assignees: Xiamen Tianma Micro-Electronics Co., Ltd., Xiamen (CN); Tianma Micro-Electronics Co., Ltd., Shenzhen (CN)

( * ) Notice: Subject to any disclaimer, the term of this patent is extended or adjusted under 35 U.S.C. 154(b) by 127 days.

(21) Appl. No.: 14/921,900

(22) Filed: Oct. 23, 2015

(65) Prior Publication Data

US 2016/0328075 A1   Nov. 10, 2016

(30) Foreign Application Priority Data

May 8, 2015   (CN) .......................... 2015 1 0232471

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01)

(58) Field of Classification Search
CPC ....... G06F 3/0412; G06F 3/044; G06F 3/0416
See application file for complete search history.

(56) References Cited

U.S. PATENT DOCUMENTS

| | | | | |
|---|---|---|---|---|
| 6,229,510 B1* | 5/2001 | Kim | ...................... | G02F 1/1362 345/87 |
| 2010/0244854 A1* | 9/2010 | Kang | ................. | G01R 31/2884 324/555 |
| 2013/0335342 A1* | 12/2013 | Kim | ........................ | G06F 3/044 345/173 |

(Continued)

FOREIGN PATENT DOCUMENTS

| CN | 1253303 A | 5/2000 |
|---|---|---|
| CN | 1991450 A | 7/2007 |
| CN | 101847376 A | 9/2010 |

(Continued)

*Primary Examiner* — Kent W Chang
*Assistant Examiner* — Chayce R Bibbee
(74) *Attorney, Agent, or Firm* — Faegre Drinker Biddle & Reath LLP

(57) ABSTRACT

A touch display panel, a driving method and a touch display device, where the touch display panel includes a control unit; a plurality of separated common electrode blocks which are disposed as a matrix, and operable as touch electrodes, where the common electrode blocks are divided into at least two common electrode groups; a plurality of first lines, each of which is electrically connected with a common electrode block; a plurality of second lines, which are electrically connected with the control unit, and configured to be respectively connected electrically with the plurality of first lines to input touch driving signals to the first lines in a touch phase; and at least two third lines, which are electrically connected with the control unit, and configured to be electrically connected with the first lines corresponding to one of the common electrode groups.

15 Claims, 7 Drawing Sheets

(56) References Cited

U.S. PATENT DOCUMENTS

2014/0184534 A1* 7/2014 Lee ................... G06F 3/0412
                                                    345/173
2016/0291746 A1* 10/2016 Kim ................... G06F 3/0412

FOREIGN PATENT DOCUMENTS

| CN | 103426413 A | 12/2013 |
| CN | 103488325 A | 1/2014 |
| CN | 103578439 A | 2/2014 |
| CN | 104536604 A | 4/2015 |

* cited by examiner

TOUCH DISPLAY PANEL, DRIVING METHOD AND TOUCH DISPLAY DEVICE

CROSS-REFERENCE TO RELATED APPLICATION

This application claims priority to Chinese Application No. 201510232471.X, filed May 8, 2015, which is herein incorporated by reference in its entirety.

TECHNICAL FIELD

The disclosure relates to the field of touch display technologies and, in particular, to a touch display panel, a driving method and a touch display device.

BACKGROUND

Currently, a display panel having a touch sensing function has increasingly become a dominant display product. So far, a touch panel may be integrated with a display panel in various manners, obtaining an in-cell display panel, an on-cell display panel and an add-on type display panel. Further, depending on their operation principles, the display panels having the touch sensing function include a capacitive touch display panel, a resistive touch display panel, an infrared touch display panel and so on. The capacitive touch display panels include a self-capacitive touch display panel and a mutual-capacitive touch display panel. In the self-capacitive touch display panel, electrodes configured for the touch sensing function are typically disposed in an outer substrate of the display panel, thus the self-capacitive touch display panel has a small overall thickness and a light weight.

In the self-capacitive touch display panel, a common electrode is divided into a plurality of common electrode blocks arranged in a matrix. When the self-capacitive touch display panel operates in a touch mode, touch driving signals are transmitted to the plurality of common electrode blocks to detect whether a touch exists; and when the self-capacitive touch display panel operates in a display mode, a common voltage is applied to the plurality of common electrode blocks to achieve a display function. However, a difference may exist between a common voltage firstly received by a common electrode block at a side and a common voltage lastly received by a common electrode block at another side, and the difference may lead to a defect of the display screen such as image flicker and image adhesion.

SUMMARY

Embodiments of the disclosure provide a touch display panel, a driving method and a touch display device, to solve technical problems of display screens such as image flicker and image adhesion in the existing self-capacitive touch display panels.

In a first example, embodiments of the disclosure provide a touch display panel, including:
- a substrate, including a display area and a non-display area;
- a control unit, which is disposed at the non-display area;
- a plurality of common electrode blocks, which are spaced from each other, disposed at the display area as a matrix, and operable as touch electrodes, wherein the common electrode blocks are divided into at least two common electrode groups according to distances between the common electrode blocks and the control unit;
- a plurality of first lines, each of which is electrically connected with one of the plurality of common electrode blocks;
- a plurality of second lines, which are electrically connected with the control unit, and configured to be respectively connected electrically with the plurality of first lines to input touch driving signals to the first lines in a touch phase; and
- at least two third lines, which are electrically connected with the control unit, where each of the at least two third lines is configured to be electrically connected with the first lines corresponding to one of the common electrode groups to input different common voltage signals to the common electrode groups in a display phase.

In a second example, embodiments of the disclosure also provide a driving method of a touch display panel, including:
- electrically connecting each third line with a first line leading to a corresponding common electrode group corresponding to the third line in a display phase; and
- inputting different common voltage signals to the third lines corresponding to different common electrode groups.

In a third example, embodiments of the disclosure also provide a touch display device, including the above touch display panel.

Technical solutions provided by embodiments of the disclosure have at least the following advantages.

In the technical solutions, common electrode blocks are divided into a plurality of common electrode groups according to distances between the common electrode blocks and the control unit, and the same common voltage is transmitted to common electrode blocks in each common electrode group, and different common voltages are transmitted to different common electrode groups, so as to compensate different common voltages of different common electrode blocks due to different consumptions of different lengths of first lines, solve technical problems of display screen such as image flicker and image adhesion, and improve display effects of the display screen.

While multiple embodiments are disclosed, still other embodiments of the disclosure will become apparent to those skilled in the art from the following detailed description, which shows and describes illustrative embodiments of the disclosure. Accordingly, the drawings and detailed description are to be regarded as illustrative in nature and not restrictive.

BRIEF DESCRIPTION OF THE DRAWINGS

The accompanying drawings used for describing embodiments of the disclosure are briefly introduced below so as to clearly illustrate technical solutions in embodiments of the disclosure. Obviously, the accompanying drawings described below illustrate merely some embodiments of the disclosure, and other drawings may be derived from content of the embodiments of the disclosure and these accompanying drawings.

Figure 1:
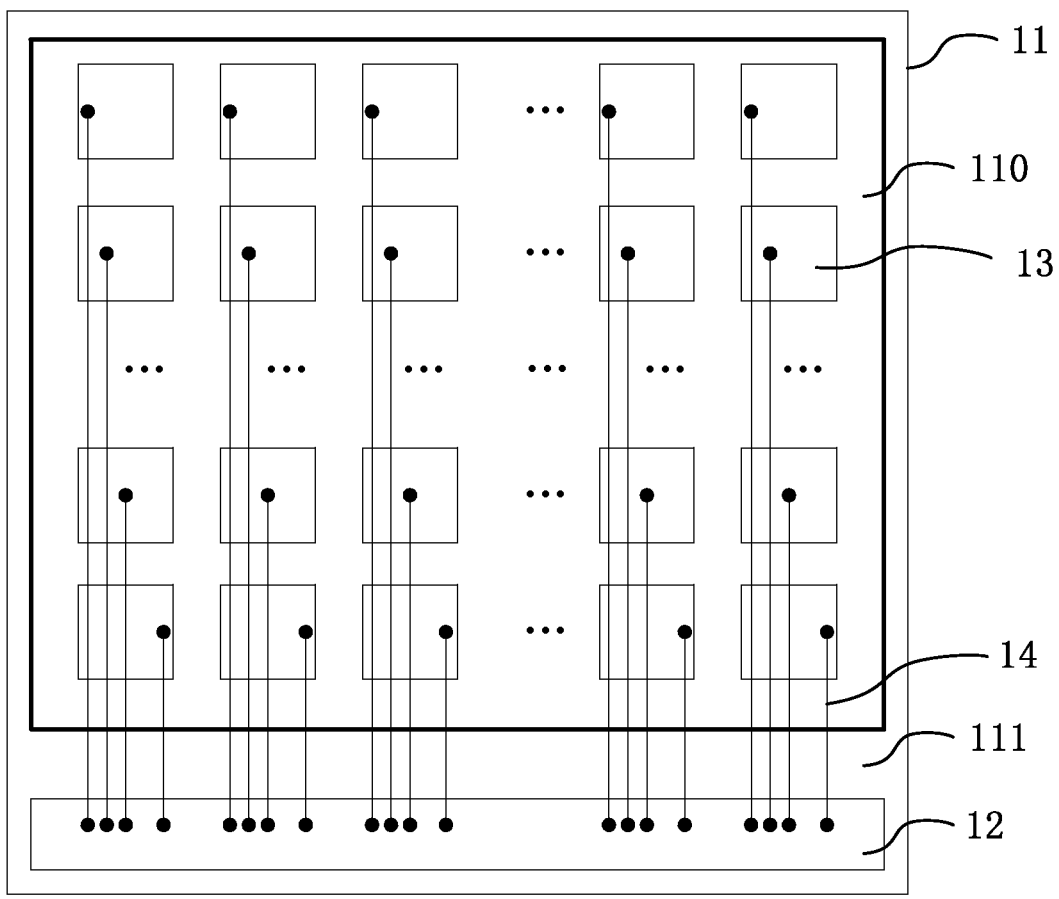
FIG. 1 is a schematic diagram showing a structure of a touch display panel in the related art.

While the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

Technical solutions of embodiments of the disclosure will be further described in detail below in combination with the accompanying drawings to make the solved technical problem, the adopted technical solutions and the achieved technical effect of the disclosure more clear. Obviously, the described embodiments are merely some of the embodiments of the disclosure rather than all of the embodiments. Based on the embodiments in the disclosure, other embodiments derived from the disclosure fall within the protection scope of the disclosure.

FIG. 1 is a schematic diagram showing a structure of a touch display panel in the related art. As shown in FIG. 1, a touch display panel 10 includes a substrate 11, a control unit 12, a plurality of common electrode blocks 13 and a plurality of first lines 14. The substrate 11 includes a display area 110 and a non-display area 111; the control unit 12 is disposed in the non-display area 111; and one end of each first line 14 is connected with the control unit 12, while the other end of the first line 14 is connected with a common electrode block 13. The touch display panel 10 is a self-capacitive touch display panel, in which the common electrode blocks 13 are also operable as touch electrode blocks, and the time for each frame includes a display phase and a touch phase. Within the display phase, display driving signals are received by the common electrode blocks 13, so that an electric field is generated between the common electrode blocks 13 and pixel electrodes (not shown in FIG. 1) to control rotation of liquid crystal molecules for the purpose of a display function; and within the touch phase, touch driving signals are received by the common electrode blocks 13 to achieve the touch sensing function. The self-capacitive touch display panel has advantages such as small thickness, light weight, high resolution, high transmittance, low power consumption, broad viewing angle and low chromatic aberration. Because distances between different common electrode blocks 13 and the control unit 12 are different, and the first lines 14 having different lengths cause different losses, after voltages are applied to the common electrode blocks 13 within the display phase, there are differences between common voltages received by the common electrode blocks 13 near the control unit 12 and common voltages received by the common electrode blocks 13 far from the control unit 12, resulting in image flicker and image adhesion in the display screen, thus a display effect of the display screen is affected.

Figure 2:
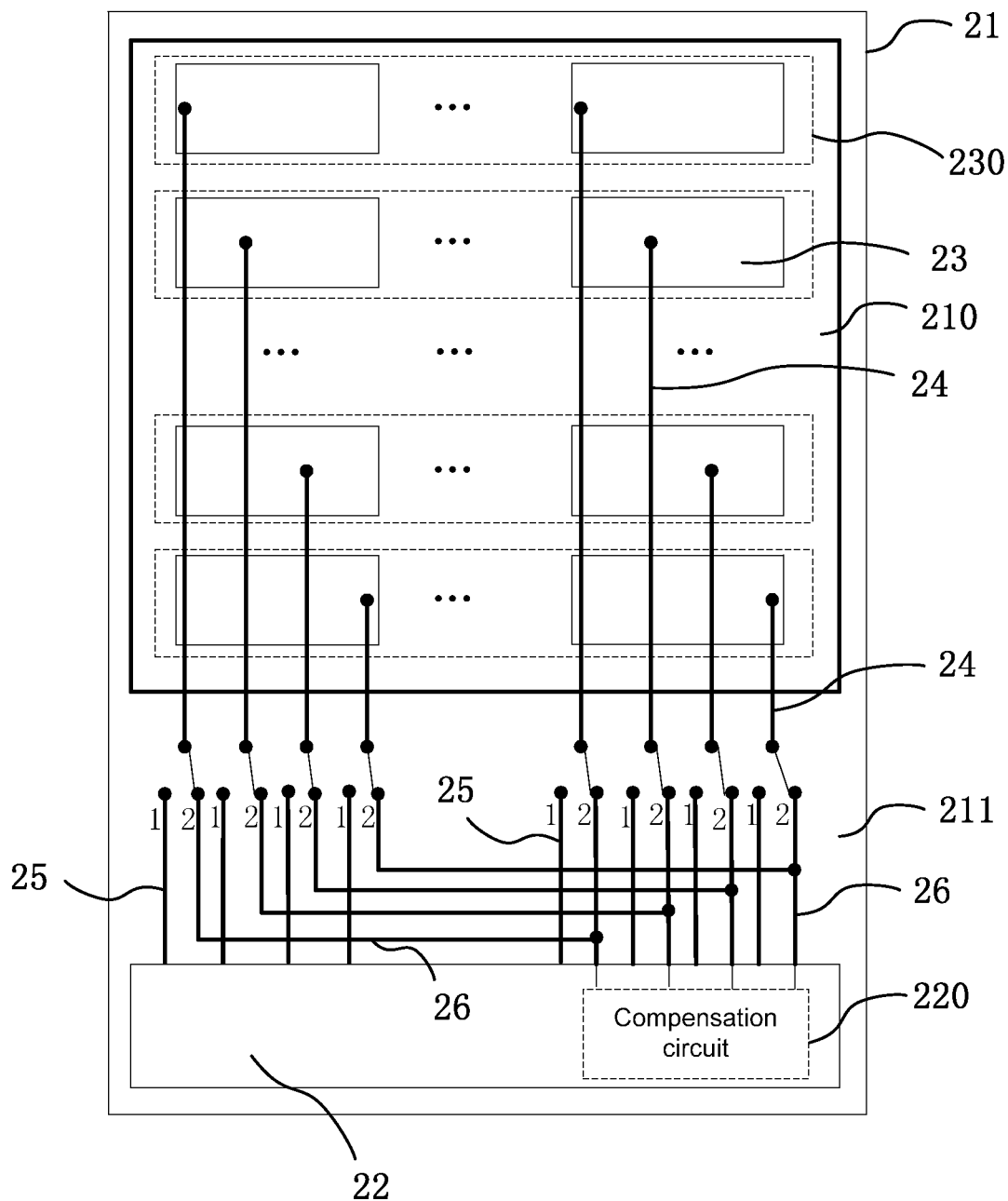
FIG. 2 is a schematic diagram showing a structure of a touch display panel, according to embodiments of the disclosure.

Embodiments of the disclosure provide a touch display panel. FIG. 2 is a schematic diagram showing a structure of a touch display panel, according to embodiments of the disclosure. As shown in FIG. 2, the touch display panel 20 includes a substrate 21, a control unit 22, a plurality of common electrode blocks 23, a plurality of first lines 24, a plurality of second lines 25 and at least two third lines 26. The substrate 21 includes a display area 210 and a non-display area 211; the control unit 22 is disposed at the non-display area 211; and the plurality of common electrode blocks 23, which are spaced from each other, are disposed at the display area 210 as a matrix, and are operable as touch electrodes. The common electrode blocks 23 are divided into at least two common electrode groups 230 according to distances between the common electrode blocks 23 and the control unit 22; the plurality of first lines 24 are electrically connected with the common electrode blocks 23, respectively; and the plurality of second lines 25 are each electrically connected with the control unit 22. Each of the second lines 25 is electrically connected with a first line 24 during the touch phase to apply a touch driving signal to the first line 24. The at least two third lines 26 are each electrically connected with the control unit 22, and are respectively connected electrically with the first lines 24 during the display phase. Third lines 26 corresponding to the common electrode blocks 23 in each common electrode group 230 are connected to the same common voltage pin of the control unit 22, and different common electrode groups 230 correspond to different common voltage pins on the control unit 22, respectively.

In embodiments of the disclosure, the common electrode blocks 23 also function as touch electrode blocks during the touch phase, and time for each frame includes a display phase and a touch phase. Within the display phase, display driving signals are received by the common electrode blocks 23 from the control unit 22, so that an electric field is generated between the common electrode blocks 23 and pixel electrodes (not shown in FIG. 2) to control rotation of liquid crystal molecules for the purpose of a display function; and within the touch phase, touch driving signals are received by the common electrode blocks 23 from the control unit 22 to achieve the touch sensing function. In some embodiments, the time for one frame lasts for 16.7 milliseconds, and lengths of the display phase and the touch phase are adjustable according to actual situations. During the display phase, the common electrode blocks 23 are divided into a plurality of common electrode groups 230 according to distances between the common electrode blocks 23 and the control unit 22, the same common voltage is applied to common electrode blocks 23 in each common electrode group 230, and different common voltages are transmitted to different common electrode groups 230, so as to compensate differences in common voltages received by different common electrode blocks 23 due to different losses of the first lines 24 caused by their different lengths, solve technical problems such as image flicker and image adhesion of the display screen, and improve a display effect of the display screen.

In embodiments of the disclosure, common electrode blocks 23 that are distant from the control unit 22 by the same distance are classified into the same common electrode group 230, therefore, the first lines 24 to the common electrode blocks 23 in each common electrode group 230 have the same lengths. The control unit 22 includes a compensation circuit 220 which is configured to provide common voltage signals to the common electrode blocks 23 of the common electrode groups 230, where the common voltage signals decrease in sequence as the distances between the common electrode groups 230 and the control unit 22 decrease. By providing different common voltages to different common electrode groups 230, differences between the common voltages applied to different common electrode blocks 23 are eliminated at high compensation accuracy, so that the display effect of the display screen is improved.

The control unit 22 includes a storing unit (not shown in FIG. 2) which is configured to store common voltage compensating signals each corresponding to one of the common electrode groups 230, thus a common voltage signal applied to each common electrode group 230 by the control unit 22 equals a reference common voltage signal plus the common voltage compensating signal corresponding to the common electrode group 230. Since the common voltage signal output by the compensation circuit 220 is a combination of the reference common voltage signal with a common voltage compensating signal, different common electrode groups 230 correspond to different common voltage compensating signals, where the common voltage compensating signal corresponding to each common electrode group 230 can be determined by experiments. Also, the common voltage compensating signal for each common electrode group 230 can be determined from processing a common voltage signal fed back by the common electrode group 230. There are a plurality of methods and circuits for determining the common voltage compensating signals, which are not repeatedly described herein, and details thereof can be referred to relative materials.

Figure 3:
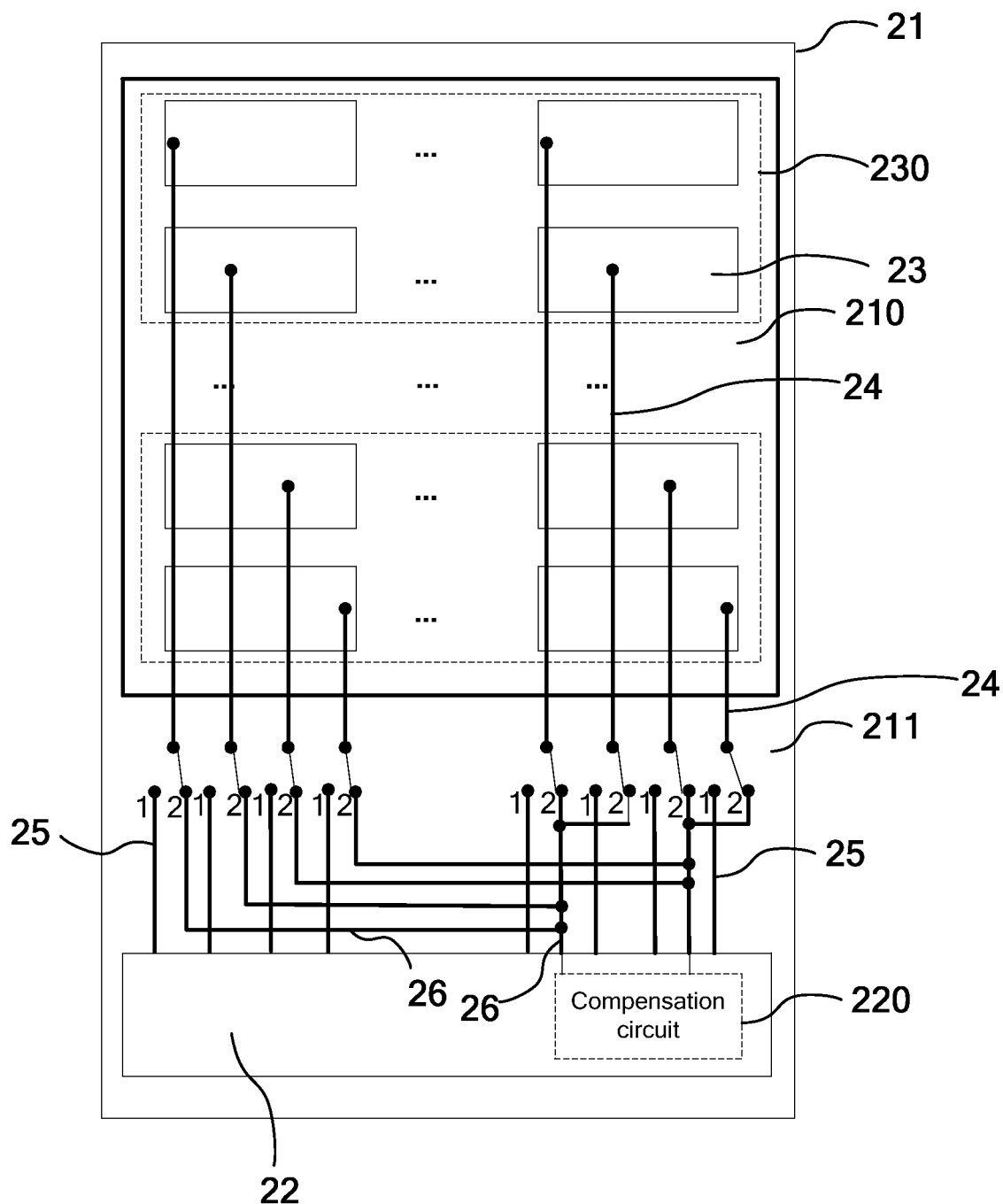
FIG. 3 is a schematic diagram showing a structure of another touch display panel, according to embodiments of the disclosure.

In some embodiments, adjacent two or three rows of common electrode blocks 23 can be classified into one and the same common electrode group 230. Here, common electrode blocks 23 distant from the control unit 22 by the same distance form a row of common electrode blocks 23, and differences between losses caused by the first lines 24 corresponding to adjacent two or three rows of common electrode blocks 23 may be ignored because differences between lengths of these first lines 24 are insignificant. FIG. 3 is a schematic diagram showing a structure of another touch display panel, according to embodiments of the disclosure. The embodiments of FIG. 3 are different from the embodiments of FIG. 2 in that: every two rows of common electrode blocks 23 in the touch display panel 20 of FIG. 3 form one common electrode group 230, third lines 26 corresponding to common electrode blocks 23 in each common electrode group 230 are connected to the same common voltage pin of the control unit 22, and different common electrode groups 230 correspond to different common voltage pins of the control unit 22. The number of rows of common electrode blocks 23 in each common electrode group 230 is not limited to two or three, which is described for illustration, but is not for limiting the disclosure.

Figure 4:
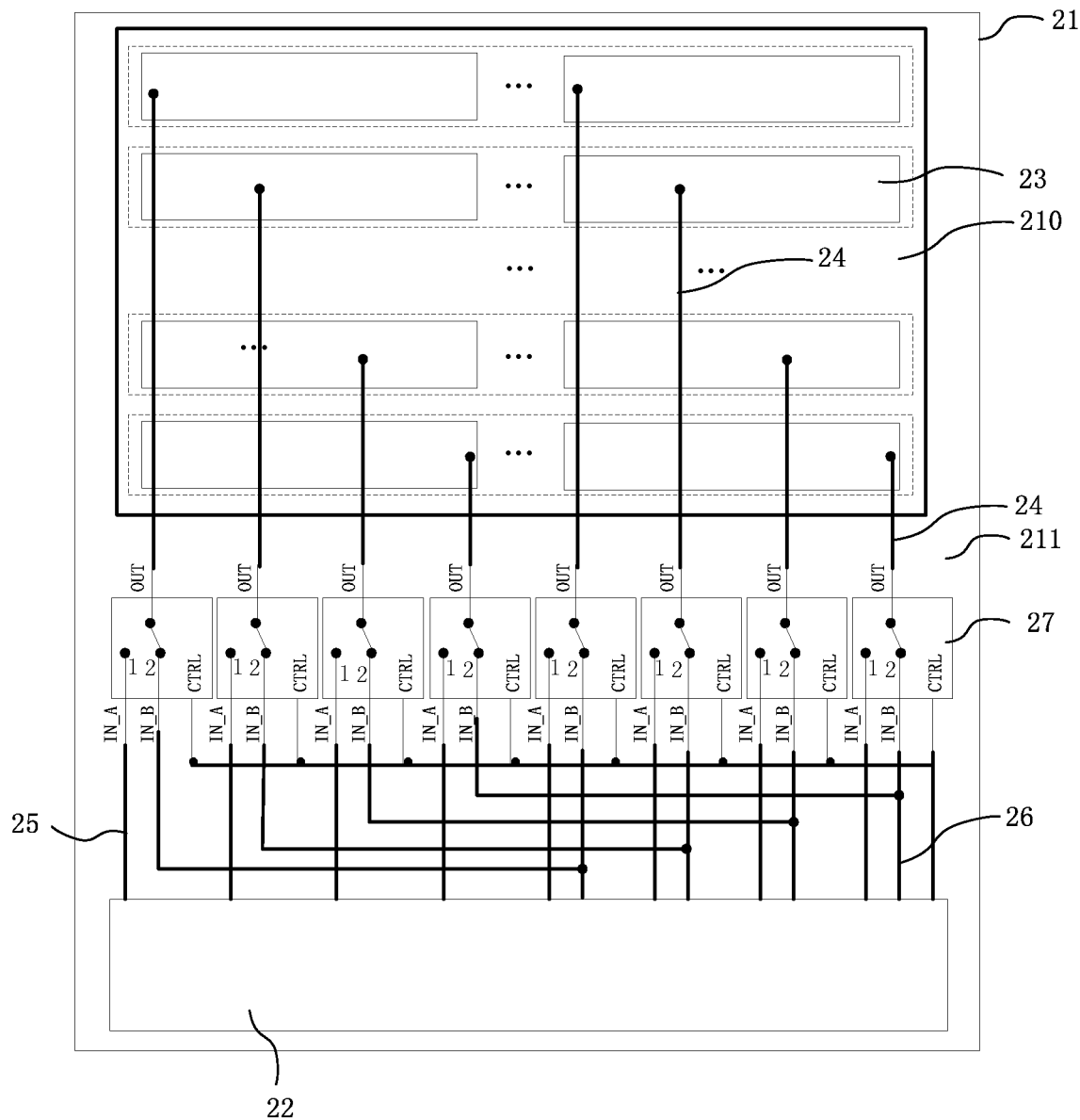
FIG. 4 is a schematic diagram showing a structure of yet another touch display panel, according to embodiments of the disclosure.
Figure 5:
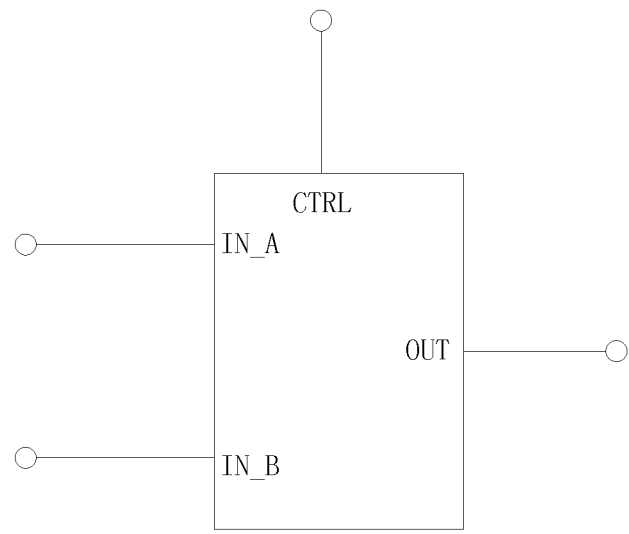
FIG. 5 is a schematic diagram showing pins of a switch, according to embodiments of the disclosure.

FIG. 4 is a schematic diagram showing a structure of yet another touch display panel, according to embodiments of the disclosure, and FIG. 5 is a schematic diagram showing pins of a switch, according to embodiments of the disclosure. Referring to FIGS. 4 and 5, a touch display panel further includes a plurality of switches 27 each including a control terminal CTRL, a first input terminal IN_A, a second input terminal IN_B and an output terminal OUT. The first input terminal IN_A of each switch 27 is electrically connected with one second line 25, the output terminal OUT of each switch 27 is electrically connected with one first line 24, second input terminals IN_B of switches 27 corresponding to common electrode blocks 23 in each common electrode group 230 are electrically connected to the same third line 26, and control terminals CTRL of all the switches 27 are electrically connected with each other and are connected to the control unit 22. Second input terminals IN_B of switches 27 corresponding to different common electrode groups 230 respectively correspond to different common voltage pins of the control unit 22. During the touch phase, all the switches 27 switch to their first input terminals IN_A under the control of their control terminals CTRL (that is, the first input terminals IN_A are connected to the respective first lines 24), and touch driving signals are inputted to the first input terminals IN_A by the control unit 22 through the second lines 25, so that the touch driving signals are further forwarded to the first lines 24 via the switches 27 to be applied to the respective common electrode blocks 23; while during the display phase, all the switches 27 switch to the second input terminals IN_B under the control of the control terminals CTRL, and common voltage signals are inputted to the third lines 26 by the control unit 22, so that the common voltage signals are forwarded to the first lines 24 by the switches 27 to be applied to the respective common electrode blocks 23. Here, the common voltage signals decrease in sequence as the distances between the common electrode groups 230 and the control unit 22 decreases, so that differences between the common voltages applied to different common electrode blocks 23 are eliminated, and the display effect of the display screen is improved.

Figure 6:
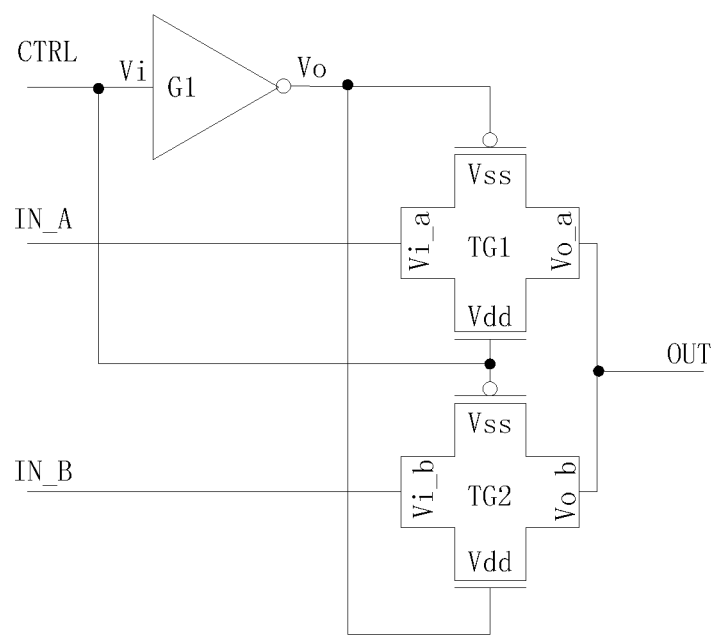
FIG. 6 is a schematic diagram showing a specific structure of the switch shown in FIG. 5.

FIG. 6 is a schematic diagram showing a specific structure of the switch shown in FIG. 5. Refer to FIG. 6, each switch 27 includes an inverter G1, a first transmission gate TG1 and a second transmission gate TG2. An output terminal Vo of the inverter G1 is connected with a first power supply terminal Vss of the first transmission gate TG1, a second power supply terminal Vdd of the first transmission gate TG1 is connected with a first power supply terminal Vss of the second transmission gate TG2, a second power supply terminal Vdd of the second transmission gate TG2 is connected with the output terminal Vo of the inverter G1, and an output terminal Vo_a of the first transmission gate TG1 is connected with an output terminal Vo_b of the second transmission gate TG2 and is connected to the first line 24. An input terminal Vi of the inverter G1 functions as a control terminal CTRL of the switch 27, an input terminal Vi_a of the first transmission gate TG1 is connected with the second line 25, and an input terminal Vi_b of the second transmission gate TG2 is connected with the third line 26. The input terminal Vi_a of the first transmission gate TG1 functions as a first input terminal IN_A of the switch 27, the input terminal Vi_b of the second transmission gate TG2 functions as a second input terminal IN_B of the switch 27, and the output terminal Vo_a of the first transmission gate TG1 is connected with the output terminal Vo_b of the second transmission gate TG2 and functions as an output terminal OUT of the switch 27. When a high level signal is input into the input terminal Vi of the inverter G1, the first transmission gate TG1 is turned on and an output terminal OUT thereof outputs a signal from the first input terminal IN_A; and when a low level signal is input into the input terminal Vi of the inverter G1, the second transmission gate TG2 is turned on and an output terminal OUT thereof outputs a signal from the second input terminal IN_B. This is one example of the switch which may also be achieved by other logical circuits, and this example is not for limiting the disclosure.

Figure 7:
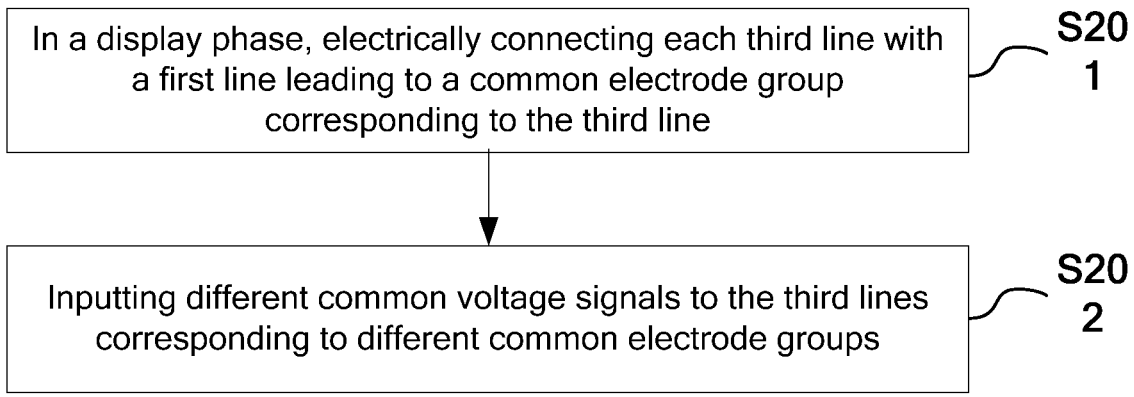
FIG. 7 is a flow chart of a driving method of a touch display panel, according to embodiments of the disclosure.

FIG. 7 is a flow chart of a driving method of a touch display panel, according to embodiments of the disclosure. With reference to both FIGS. 4 and 7, the method of a touch display panel is suitable for the above-mentioned touch display panel and includes the following steps S201 and S202.

Step S201 includes: in a display phase, electrically connecting each third line 26 with a first line 24 leading to a common electrode group 230 corresponding to the third line 26.

The switches 27 are controlled by the control unit 22 so that each of the third lines 26 is electrically connected with the first line 24 of the corresponding common electrode group 230, and reference may be made to the above for details which are not repeated here.

Step S202 includes: inputting different common voltage signals to the third lines 26 corresponding to different common electrode groups 230.

The common voltage signals applied to the common electrode groups 230 decrease in sequence as the distances between the common electrode groups 230 and the control unit 22 decreases. Different common voltage signals are outputted by the control unit 22 through different common voltage pins of the control unit 22, and each common voltage pin corresponds to one of the common electrode groups 230. When entering the display phase, the control unit 22 simultaneously inputs different common voltage signals to the third lines 26 corresponding to all the common electrode groups 230 through different common voltage pins.

In some embodiments, by providing different common voltage signals to different common electrode groups 230, differences between the common voltages applied to different common electrode blocks 23 are eliminated at high compensation accuracy, so that the display effect of the display screen is improved.

Figure 8:
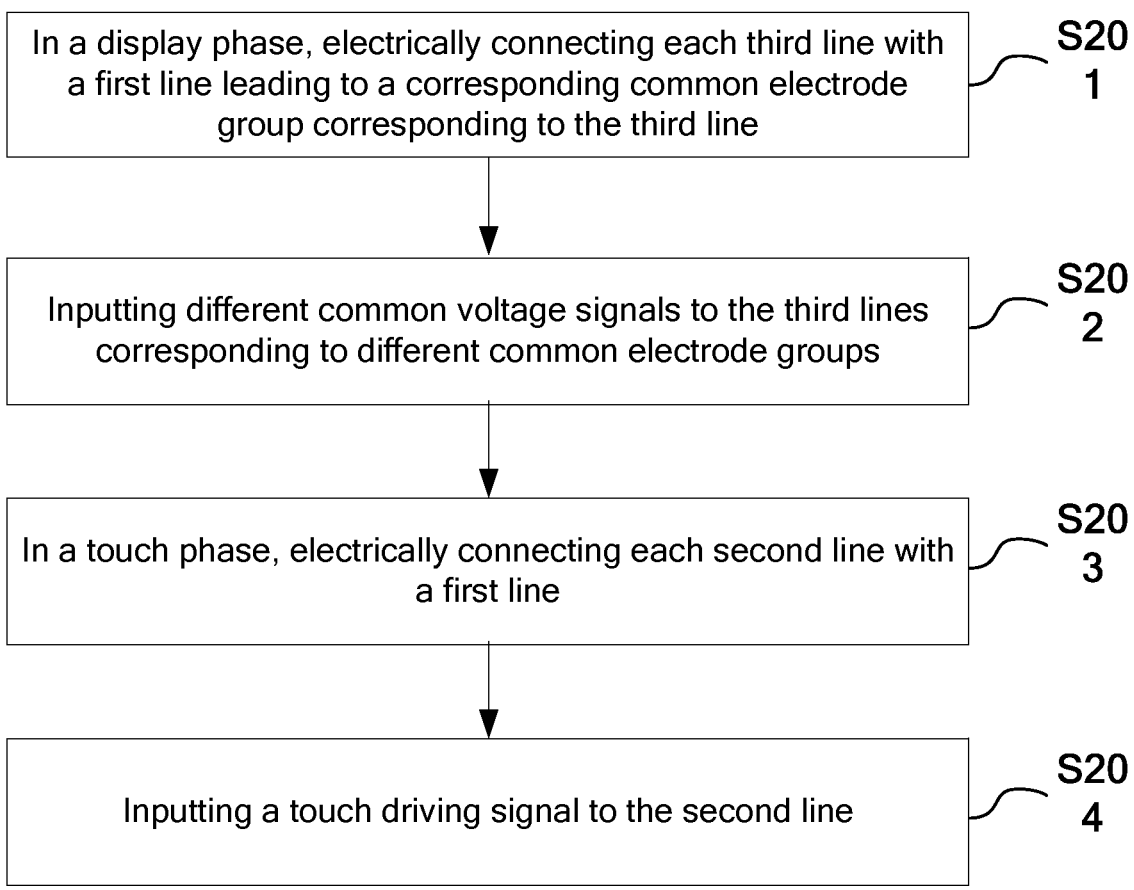
FIG. 8 is a flow chart of a driving method of a touch display panel, according to embodiments of the disclosure.

FIG. 8 is a flow chart of a driving method of a touch display panel, according to embodiments of the disclosure. With reference to FIG. 8 in combination with FIG. 4, the method of FIG. 8 is different from that of FIG. 7 by further including the following steps S203 and S204.

Step S203 includes: in a touch phase, electrically connecting each second line 25 with a first line 24.

The switches 27 are controlled by the control unit 22 so that each second line 25 is electrically connected with a first line 24 to a corresponding common electrode block 23. Reference may be made to the above for details which are not repeated here.

Step S204 includes: inputting a touch driving signal to the second line 25.

The control unit 22 may output identical touch driving signals from different touch driving signal pins. Alternatively, the control unit 22 may output a touch driving signal to all the common electrode blocks 23 through one and the same touch driving signal pin. In some embodiments, when entering the touch phase, the control unit 22 simultaneously inputs identical touch driving signals to the second lines 25 respectively corresponding to all the common electrode blocks 23 through different touch driving signal pins.

Embodiments achieve the multiplexing of the common electrode blocks 23 in the touch phase and the display phase in a time division manner. By providing different common voltage signals to different common electrode groups 230, differences between common voltages applied to different common electrode blocks 23 are eliminated at high compensation accuracy, so that the display effect of the display screen is improved.

Figure 9:
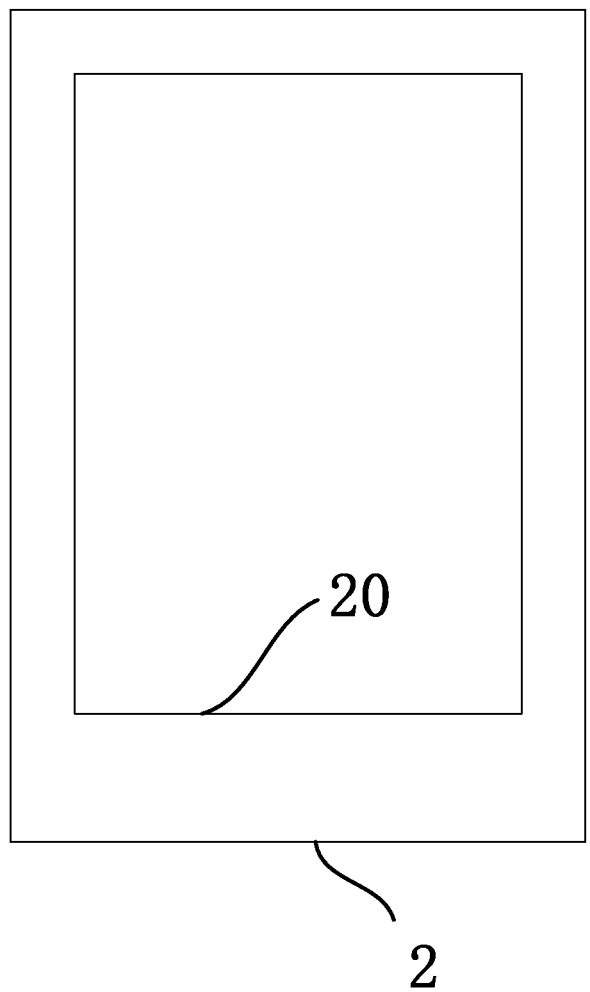
FIG. 9 is a schematic diagram of a structure of a touch display device, according to embodiments of the disclosure.

FIG. 9 is a schematic diagram showing a structure of a touch display device, according to embodiments of the disclosure. Referring to FIG. 9, a touch display device 2 includes any of the above-described touch display panels 20. The touch display device 2 is a smartphone or a computer, for example.

In the touch display device, common electrode blocks are divided into a plurality of common electrode groups according to distances between the common electrode blocks and the control unit, and the same common voltage is applied to common electrode blocks in each common electrode group, while different common voltages are applied to different common electrode groups, so as to compensate differences in common voltages received by different common electrode blocks 23 due to different losses of the first lines 24 caused by their different lengths, solve technical problems such as image flicker and image adhesion of the display screen, and improve a display effect of the display screen.

Some embodiments of the disclosure have been described as above. Some modification may be made to the embodiments and applications thereof by those skilled in the art based on the concept of the disclosure, and the content of the description should not be interpreted as a limitation to the disclosure.

Various modifications and additions can be made to the exemplary embodiments discussed without departing from the scope of the disclosure. For example, while the embodiments described above refer to particular features, the scope of this disclosure also includes embodiments having different combinations of features and embodiments that do not include all of the described features. Accordingly, the scope of the disclosure is intended to embrace all such alternatives, modifications, and variations as fall within the scope of the claims, together with all equivalents thereof.

I claim:

1. A self-capacitive touch display panel, comprising:
a substrate, including a display area and a non-display area;
a control unit, which is disposed at the non-display area;
a plurality of common electrode blocks, which are spaced from each other, disposed at the display area as a matrix, and operable as touch electrodes in a touch phase, wherein the plurality of common electrode blocks are divided into at least two common electrode groups according to distances between the plurality of common electrode blocks and the control unit, and wherein each of the at least two common electrode groups comprises at least one row of the plurality of common electrode blocks;
a plurality of first lines, each of which is electrically connected with one of the plurality of common electrode blocks;
a plurality of second lines, which are electrically connected with the control unit, wherein in the touch phase, each of the plurality of second lines is electrically connected with one of the plurality of first lines to input touch driving signal to the one of the plurality of first lines;
at least two third lines, which are electrically connected with the control unit, wherein in a display phase, each of the at least two third lines is electrically connected with and transmits a same common voltage signal to each of the plurality of first lines connected to a plurality of common electrode blocks in one of the at least two common electrode groups, and the at least two third lines transmit different common voltage signals to different common electrode groups; and a plurality of switches, each including a control terminal, a first input terminal, a second input terminal and an output terminal; wherein the first input terminal of each of the plurality of switches is electrically connected with one of the plurality of second lines, the output terminal of each of the plurality of switches is electrically connected with one of the plurality of first lines, each of which is electrically connected with one of the plurality of common electrode blocks, the second input terminal of each of multiple switches of the plurality of switches that are connected to common electrode blocks in a same one of the at least two common electrode groups is electrically connected to a same one of the at least two third lines, and the control terminals of the plurality of switches are electrically connected with each other and are connected to the control unit.

2. The self-capacitive touch display panel of claim 1, wherein one row of the plurality of common electrode blocks is classified into one of the at least two common electrode groups.

3. The self-capacitive touch display panel of claim 1, wherein adjacent two or three rows of the plurality of common electrode blocks are classified into one of the at least two common electrode groups.

4. The self-capacitive touch display panel of claim 1, wherein each of the plurality of switches includes an inverter, a first transmission gate and a second transmission gate; wherein an output terminal of the inverter is connected with a first power supply terminal of the first transmission gate, a second power supply terminal of the first transmission gate is connected with a first power supply terminal of the second transmission gate, a second power supply terminal of the second transmission gate is connected with the output terminal of the inverter, an output terminal of the first transmission gate is connected with an output terminal of the second transmission gate and is connected to the one of the plurality of first lines; wherein an input terminal of the inverter is configured as a control terminal of one of the plurality of switches, an input terminal of the first transmission gate is connected with the one of the plurality of second lines, and an input terminal of the second transmission gate is connected with the same one of the at least two third lines.

5. The self-capacitive touch display panel of claim 1, wherein the control unit includes a compensation circuit which is configured to provide the common voltage signals to the plurality of common electrode blocks in the one of the at least two common electrode groups, and the common voltage signals decrease in sequence as the distances between the plurality of common electrode groups and the control unit decrease.

6. The self-capacitive touch display panel of claim 1, wherein the control unit includes a storing unit which is configured to store common voltage compensating signals each transmitted to one of the at least two common electrode groups, and the common voltage signal applied to each of the at least two common electrode groups by the control unit equals to a reference common voltage signal plus the common voltage compensating signal transmitted to the each of the at least two common electrode groups.

7. A driving method of a self-capacitive touch display panel adapted to drive a self-capacitive touch display panel, wherein the self-capacitive touch display panel, comprises:
a substrate, including a display area and a non-display area;
a control unit, which is disposed at the non-display area;
a plurality of common electrode blocks, which are spaced from each other, disposed at the display area as a matrix, and operable as touch electrodes in a touch phase, wherein the plurality of common electrode blocks are divided into at least two common electrode groups according to distances between the plurality of common electrode blocks and the control unit, and wherein each of the at least two common electrode groups comprises at least one row of the plurality of common electrode blocks;
a plurality of first lines, each of which is electrically connected with one of the plurality of common electrode blocks;
a plurality of second lines, which are electrically connected with the control unit, wherein in the touch phase, each of the plurality of second lines is electrically connected with one of the plurality of first lines to input touch driving signal to the one of the plurality of first lines;
at least two third lines, which are electrically connected with the control unit, wherein in a display phase, each of the at least two third lines is electrically connected with and transmits a same common voltage signal to each of a plurality of first lines connected to a plurality of common electrode blocks in one of the at least two common electrode groups, and the at least two third lines transmit different common voltage signals to different common electrode groups; and
a plurality of switches, each including a control terminal, a first input terminal, a second input terminal and an output terminal; wherein the first input terminal of each of the plurality of switches is electrically connected with one of the plurality of second lines, the output terminal of each of the plurality of switches is electrically connected with one of the plurality of first lines, each of which is electrically connected with one of the plurality of common electrode blocks, the second input terminal of each of multiple switches of the plurality of switches that are connected to common electrode blocks in a same one of the at least two common electrode groups is electrically connected to a same one of the at least two third lines, and the control terminals of the plurality of switches are electrically connected with each other and are connected to the control unit; and
the driving method comprises:
electrically connecting each of the at least two third lines with a plurality of first lines leading to a corresponding one of the at least two common electrode groups in a display phase; and
inputting different common voltage signals to different third lines connected to different common electrode groups.

8. The method of claim 7, wherein the common voltage signals decrease in sequence as distances between the plurality of common electrode groups and the control unit decrease.

9. The method of claim 7, further comprising:
electrically connecting each of the plurality of second lines with one of the plurality of first lines in a touch phase; and
inputting a touch driving signal to each of the plurality of the second lines.

10. A touch display device, comprising a self-capacitive touch display panel, including:
a substrate, including a display area and a non-display area;
a control unit, which is disposed at the non-display area;

a plurality of common electrode blocks, which are spaced from each other, disposed at the display area as a matrix, and operable as touch electrodes in a touch phase, wherein the plurality of common electrode blocks are divided into at least two common electrode groups according to distance between the plurality of common electrode blocks and the control unit, and wherein each of the at least two common electrode groups comprises at least one row of the plurality of common electrode blocks;

a plurality of first lines, each of which is electrically connected with one of the plurality of common electrode blocks;

a plurality of second lines, which are electrically connected with the control unit, wherein in the touch phase, each of the plurality of second lines is electrically connected with one of the plurality of first lines to input touch driving signal to the one of the plurality of first lines;

at least two third lines, which are electrically connected with the control unit, wherein in a display phase, each of the at least two third lines is electrically connected with and transmits a same common voltage signal to each of a plurality of first lines connected to a plurality of common electrode blocks in one of the at least two common electrode groups, and the at least two third lines transmit different common voltage signals to different common electrode groups;

a plurality of switches, each including a control terminal, a first input terminal, a second input terminal and an output terminal; wherein the first input terminal of each of the plurality of switches is electrically connected with one of the plurality of second lines, the output terminal of each of the plurality of switches is electrically connected with one of the plurality of first lines, each of which is electrically connected with one of the plurality of common electrode blocks, the second input terminal of each of multiple switches of the plurality of switches that are connected to common electrode blocks in a same one of the at least two common electrode groups is electrically connected to a same one of the at least two third lines, and the control terminals of the plurality of switches are electrically connected with each other and are connected to the control unit.

11. The touch display device of claim 10, wherein one row of the plurality of common electrode blocks is classified into one of the at least two common electrode groups.

12. The touch display device of claim 10, wherein adjacent two or three rows of the plurality of common electrode blocks are classified into one of the at least two common electrode groups.

13. The touch display device of claim 10, wherein each of the plurality of switches includes an inverter, a first transmission gate and a second transmission gate; wherein an output terminal of the inverter is connected with a first power supply terminal of the first transmission gate, a second power supply terminal of the first transmission gate is connected with a first power supply terminal of the second transmission gate, a second power supply terminal of the second transmission gate is connected with the output terminal of the inverter, an output terminal of the first transmission gate is connected with an output terminal of the second transmission gate and is connected to the one of the plurality of first lines; wherein an input terminal of the inverter is configured as a control terminal of one of the plurality of switches, an input terminal of the first transmission gate is connected with the one of the plurality of second lines, and an input terminal of the second transmission gate is connected with the same one of the at least two the third lines.

14. The touch display device of claim 10, wherein the control unit includes a compensation circuit which is configured to provide the common voltage signals to the plurality of common electrode blocks in the one of the at least two common electrode groups, and the common voltage signals decrease in sequence as the distances between the plurality of common electrode groups and the control unit decrease.

15. The touch display device of claim 10, wherein the control unit includes a storing unit which is configured to store common voltage compensating signals each transmitted to one of the at least two common electrode groups, and a common voltage signal applied to each of the at least two common electrode groups by the control unit equals to a reference common voltage signal plus the common voltage compensating signal transmitted to the each of the at least two common electrode groups.

* * * * *